(12) United States Patent
Varghese et al.

(10) Patent No.: US 12,367,463 B2
(45) Date of Patent: Jul. 22, 2025

(54) DYNAMIC SMART NOTIFICATION SCHEDULING

(71) Applicant: International Business Machines Corporation, Armonk, NY (US)

(72) Inventors: Mathew Varghese, Ernakulam (IN); Anita Duggal, Delhi (IN); Madhusmita Guru, Hyderabad (IN); Mukundan Sundararajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 17/726,613

(22) Filed: Apr. 22, 2022

(65) Prior Publication Data
US 2023/0342727 A1 Oct. 26, 2023

(51) Int. Cl.
*G06Q 10/1093* (2023.01)
*G06Q 10/0631* (2023.01)
*H04L 51/224* (2022.01)

(52) U.S. Cl.
CPC ....... *G06Q 10/1097* (2013.01); *H04L 51/224* (2022.05); *G06Q 10/06311* (2013.01); *G06Q 10/06312* (2013.01)

(58) Field of Classification Search
None
See application file for complete search history.

(56) References Cited

U.S. PATENT DOCUMENTS

| | | | |
|---|---|---|---|
| 9,912,736 B2 | 3/2018 | Allen | |
| 10,756,957 B2 | 8/2020 | Jain | |
| 10,963,049 B2 | 3/2021 | Alam | |
| 11,082,387 B1 * | 8/2021 | Vukich | H04L 51/224 |
| 11,314,563 B1 * | 4/2022 | Singh | G06F 9/541 |

(Continued)

OTHER PUBLICATIONS

"Method and Apparatus for Dynamic Notification Engine that Leverages Context Awareness and User Interactions", An IP.com Prior Art Database Technical Disclosure, Authors et al.: Disclosed Anonymously, IP.com No. IPCOM000262670D, IP.com Electronic Publication Date: Jun. 18, 2020, 5 pages.

(Continued)

*Primary Examiner* — Folashade Anderson
(74) *Attorney, Agent, or Firm* — CHIP LAW GROUP (57) ABSTRACT

Optimization of smart notifications within an organization can lead to increase productivity and reduction in missed deadlines and human work hours. An approach for to dynamic scheduling of smart notifications may be presented herein. The approach may include obtaining historical decision event data for an organization. Historical decision data may include details regarding the importance of the historical decision event to the organization, individuals within the organization associated with the decision event, and benchmarks of the historical decision event. The approach may include analyzing a future decision event based on a decision event model trained with the historical decision event data. The approach may include identifying one or more priority factors associated with the future decision event data based on the analysis of the decision event priority model. A smart notification may be scheduled for the decision event, based on the identified priority factors.

9 Claims, 6 Drawing Sheets

(56) References Cited

U.S. PATENT DOCUMENTS

| | | |
|---|---|---|
| 2007/0048706 A1 | 3/2007 | Tan |
| 2008/0046387 A1* | 2/2008 | Gopal ................... H02J 3/008 |
| | | 705/412 |
| 2010/0153160 A1* | 6/2010 | Bezemer .............. G06Q 10/109 |
| | | 705/348 |
| 2011/0307401 A1 | 12/2011 | Altman |
| 2016/0110659 A1* | 4/2016 | Skeen .................. G06Q 20/405 |
| | | 705/5 |
| 2016/0342694 A1* | 11/2016 | Allen .................... H04L 67/535 |
| 2017/0034305 A1* | 2/2017 | Blevins ................... H04L 67/12 |
| 2018/0095938 A1* | 4/2018 | Monte .................. G06Q 10/109 |
| 2024/0095682 A1* | 3/2024 | Lightbody ......... G06Q 10/1095 |

OTHER PUBLICATIONS

Mell et al., "The NIST Definition of Cloud Computing", Recommendations of the National Institute of Standards and Technology, NIST Special Publication 800-145, Sep. 2011, 7 pages.

\* cited by examiner

DYNAMIC SMART NOTIFICATION SCHEDULING

BACKGROUND OF THE INVENTION

The present invention relates generally to the field of artificial intelligence, and more specifically, to dynamic scheduling of smart notifications.

Notification systems play an important role in the decision making processes of organizations. A user may have a calendar with their schedule and important benchmarks in the calendar. The benchmarks may provide a number of different types of notices in which to remind the user to perform a task. Notification systems can also send alerts to many members of an organization or individual alerts if a task is required to be performed or a decision needs to be made. Attempts have been made to individualize notifications for a user based on a user's past history of responses.

SUMMARY

Embodiments of the present disclosure include a computer-implemented method, a computer system, and a computer program product for dynamic alert scheduling. Embodiments of the invention may include training an event decision priority model based, at least in part, on the historical decision event data. Embodiments of the invention may include receiving a future decision event associated with a group within a current organization hierarchy. Embodiments of the invention may include analyzing the future decision event based on the event decision priority model. Embodiments of the invention may include identifying one or more priority factors associated with the future decision event based, at least in part, on the analysis of the future decision event. Embodiments of the invention may include scheduling a smart notification for the future decision event based on the identified one or more priority factors.

It should be understood, the above summary is not intended to describe each illustrated embodiment of every implementation of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Embodiments of the invention appreciate the need to dynamically schedule notifications and the computed repetition notification associated with decision events of an organization. As situations change, decision events may require the attention of an individual at different times. Additionally, individuals have different workflows, thus requiring notifications at different points in time. The different workflows must sync up to a timeline when a decision event must be completed. Therefore, a system which can factor in the workflow of an individual, group within an organization, and the workflow of the organization itself should improve a decision making process by scheduling notifications or blocking time for an individual to concentrate on a decision event. Likewise, the smart notification can be sent to an individual, select members within a group associated with a decision event, or the entire group associated with a decision event. The frequency, temporal spread, temporal instances, and user selection for smart repeating notifications can be determined as a function of pending actions among a group of individuals associated with a decision event. It is necessary to optimize the number of repeating notification, to prevent individuals associated with the decision event from becoming annoyed or ignoring the notifications. An advantage of these functions can cause the improved user's appreciation of the notification system. A decision event is any action within an organization which requires a decision to be made or an action to be undertaken. A decision event can be, for example, purchasing a business related item, completing a contract, creating a presentation, preparing for a meeting, writing a memorandum, etc.

The embodiments depicted herein are for dynamic smart scheduling of notifications. In an embodiment of the invention, a dynamic notification scheduling system can receive a future decision event associated with a group of individuals within an organizational hierarchy. The dynamic notification scheduling system can analyze the future decision event based on decision event priority model trained with historical event decision data. The dynamic notification scheduling system can identify priority factors associated with the future decision event based on the analysis by the decision event priority model. A smart notification can be scheduled based on the identified priority factors.

In an embodiment, individual profiles of members of an organization may be utilized in conjunction with a decision event database which contains information relating to the historical decision events of that organization. Further, a dynamic smart notification system can build an organizational hierarchy from the individual profiles and the decision event database. A priority score for a decision event can be determined utilizing the organizational hierarchy and a priority score for a future decision event. In some embodiments, factors associated with the future decision event can be identified based on the group of individuals within the organization working on the future decision event and parsing similar past future decision events. Factors identified can be utilized to schedule personalized notifications or reminders to complete tasks related to a decision event.

In an embodiment, the smart notification system can monitor the pending action counts to compute for the organization, based on a priorly defined second order system model, the dynamically determined additional temporal points to schedule further personalized reminders. Further embodiments may assist in creating the factor groups of dependent attributes which can assist in sending smart notifications. Embodiments may also include the utilization of one or more heuristic methods to calculate or establish delay factors and/or temporal separation windows which can be utilized to determine when to schedule and send a final notification. Additionally, embodiments may calculate a time in which to trigger outliers of a group's actions for the model. In some embodiments, user default settings may be determined and provide suggestions of measurable actions or lack of response to alerts or smart notifications and update the smart notification module accordingly to adjust smart notification scheduling frequency.

Figure 1:
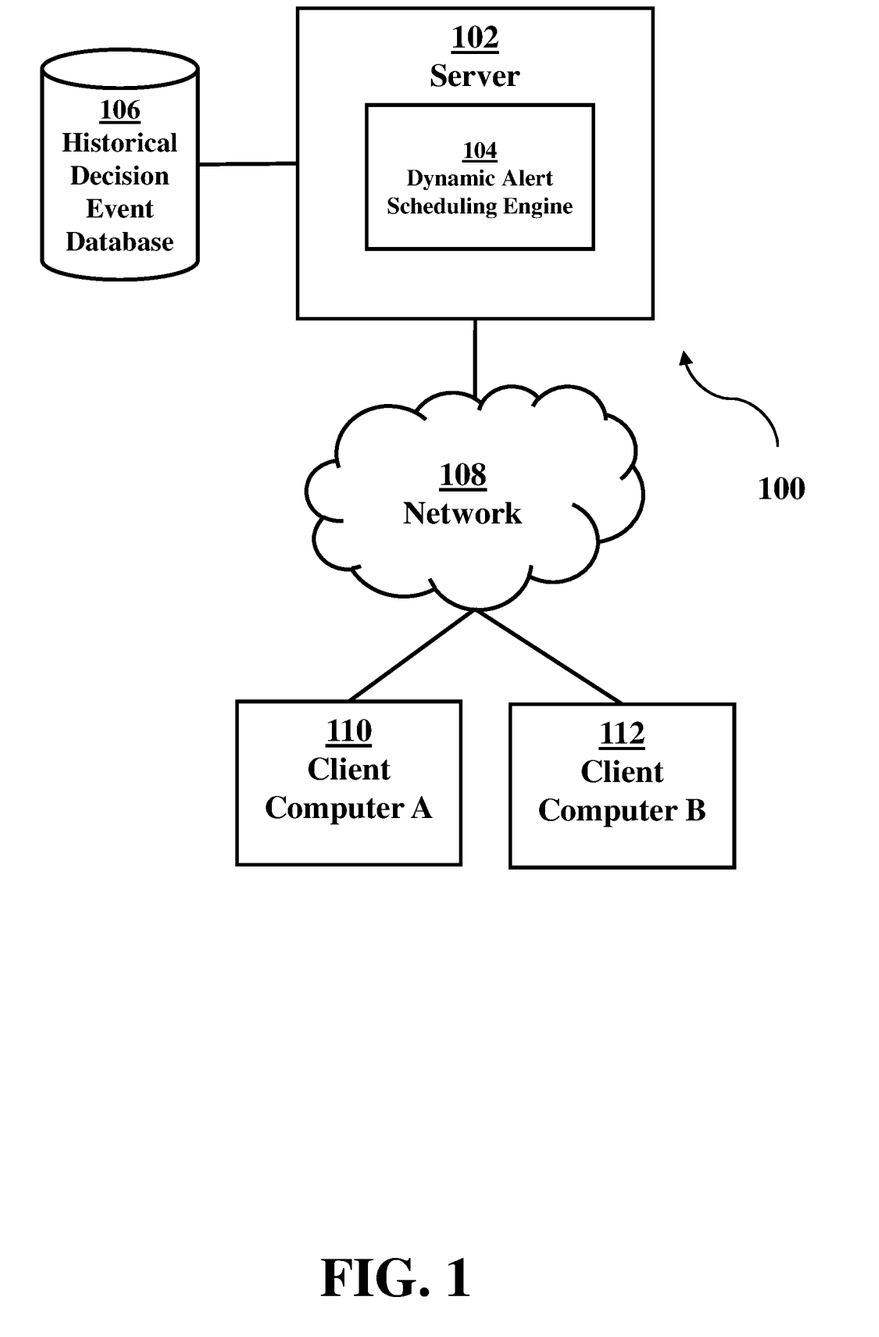
FIG. 1 is a functional block diagram of a dynamic alert scheduling system, generally designated 100, in accordance with an embodiment of the present invention.

Referring now to the Figures, FIG. 1 is a functional block diagram generally depicting dynamic alert scheduling system 100, in accordance with an embodiment of the invention. Dynamic alert scheduling system 100 comprises dynamic alert scheduling engine 104 operational on server 102 and historical decision event database 106 stored on server 102. Also depicted in dynamic alert scheduling system 100 is client computer A 110 and client computer B 112 interconnected over network 108. In an alternative embodiment, historical decision event database 106 can be located on a separate computational device, other than server 102, such as client computer A 110 or client computer B 112, or any other computing device in communication with dynamic alert scheduling engine 104 via network 108.

Server 102, client computer A 110, and client computer B 112 can be a standalone computing device, a management server, a web server, a mobile computing device, or any other electronic device or computing system capable of receiving, sending, and processing data. In other embodiments, server 102, client computer A 110, and client computer B 112 can represent a server computing system utilizing multiple computers as a server system such as in cloud computing environment 50 (depicted in FIG. 5). In an embodiment, server 102, client computer A 110, and client computer B 112 can represent a computing system utilizing clustered computers and components (e.g., database server computers, application server computers, etc.) that act as a single pool of seamless resources when accessed within dynamic alert scheduling system 100. In another embodiment, server 102 client computer A 110, and client computer B 112 can be a laptop computer, a tablet computer, a netbook computer, a personal computer, a desktop computer, or any programmable electronic device or combination of programmable electronic devices capable of executing machine readable program instructions and communicating with each other, and other computing devices (not depicted) within dynamic alert scheduling system 100 via network 108. It should be noted, while only a single device is shown in FIG. 1 for server 102 client computer A 110, and client computer B 112, in other embodiments, multiple servers or other computing devices can be present within dynamic alert scheduling system 100.

Figure 4:
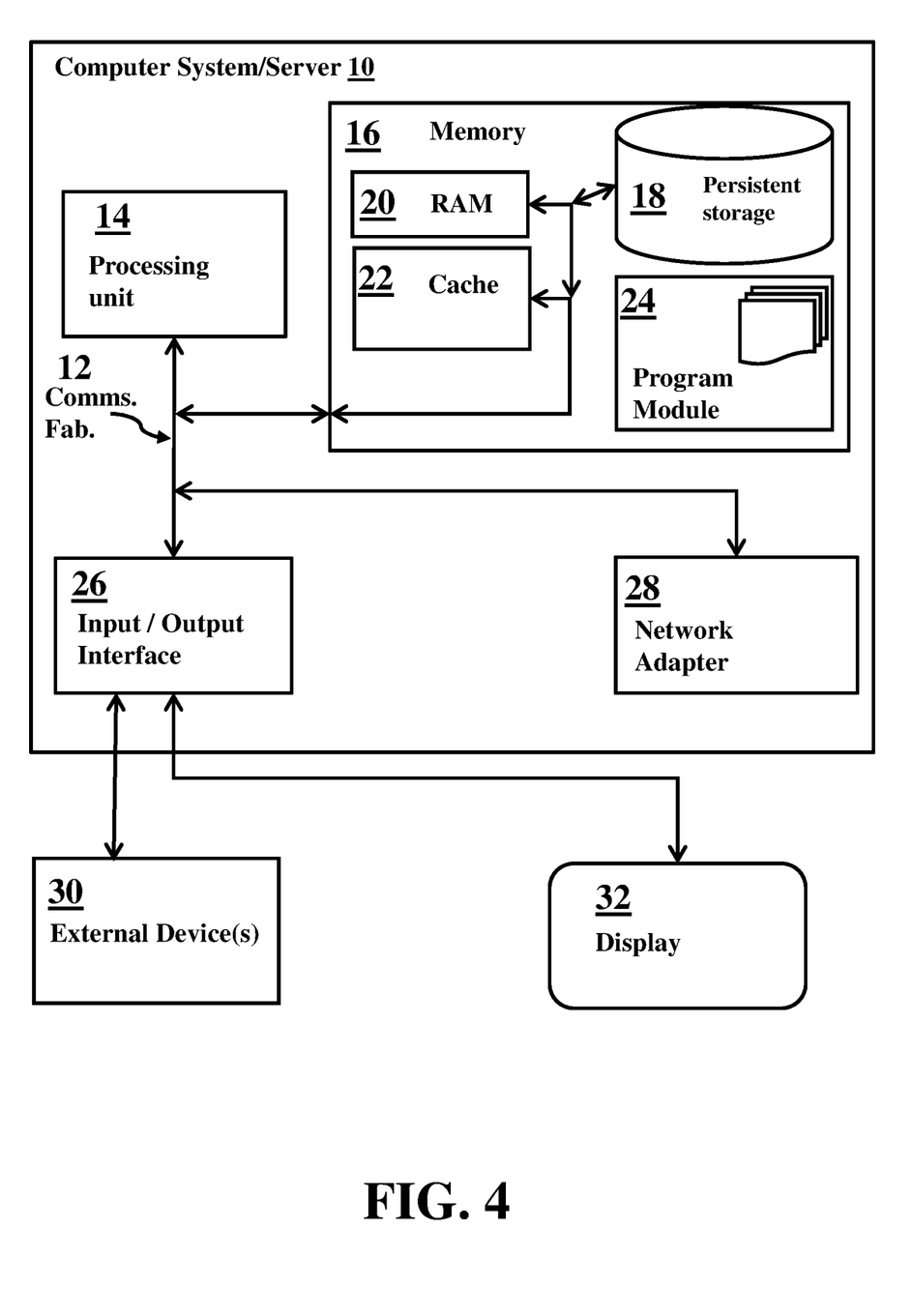
FIG. 4 is a functional block diagram of an exemplary computing system 10 within a dynamic alert scheduling system environment, in accordance with an embodiment of the present invention.

Server 102, client computer A 110, and client computer B 112 may include components as depicted and described in further detail with respect to computer system 10 in FIG. 4. Server 102, client computer A 110, and client computer B 112 may include components as depicted and described in further detail with respect to cloud computing node 40 of cloud computing environment 50 in FIG. 5. It should be noted, in an embodiment client computer A 110 and client computer B 112 may have a secondary notification program and user interface, such as a calendar application which is in communication with dynamic alert scheduling engine 104. In this embodiment, the secondary notification program can allow for users that are logged into a notification program through client computer A 110 and/or client computer B 112 to receive smart notifications regarding decision events.

Network 108 can be a telecommunications network, a local area network (LAN), a wide area network (WAN), such as the Internet, or a combination of the three, and can include wired, wireless, or fiber optic connections. Network 108 may include one or more wired and/or wireless networks that are capable of receiving and transmitting data, voice, and/or video signals, including multimedia signals that include voice, data, and video information. In general, network 108 can be any combination of connections and protocols that will support communications between server 102, client computer A 110, and client computer B 112 and external computing devices (not shown) within dynamic alert scheduling system 100.

Dynamic alert scheduling engine 104 is a computer program capable of dynamically scheduling and sending notifications regarding decision events to users associated with the decision event. Scheduling the decision events can be based on a multitude of factors (described further below). Further, in scheduling the decision events, each user can have an individualized approach to optimize the notifications impact on an individual, multiple individuals within a group, or an entire group itself within an organization. In an embodiment, multiple clones of dynamic alert scheduling engine 104 can be present on the same server or multiple servers within dynamic alert scheduling system 100. For example, dynamic alert scheduling engine 104 may be a program such as a calendar/email program which dynamically accounts for group/individual tendencies to optimize notification schedules. Further, a program with dynamic alert scheduling engine 104 can be a service that is configured to operate on a server or cloud based platform (public, hybrid, or private).

Historical decision event database 106 is a database storing all actions, responses, and associated data relating to the decision events of an organization. Further, historical decision event database 106 can store data relating to individuals and group hierarchy within a relationship. For example, historical decision event database 106 can store profiles relating to individuals including their position within an organization. The profile may also include contacts of an individual relating to a decision event with other individuals within the organization. A profile may also include the timeframe at which an individual undertakes actions relating to a decision event and the outcome of the action.

Figure 2:
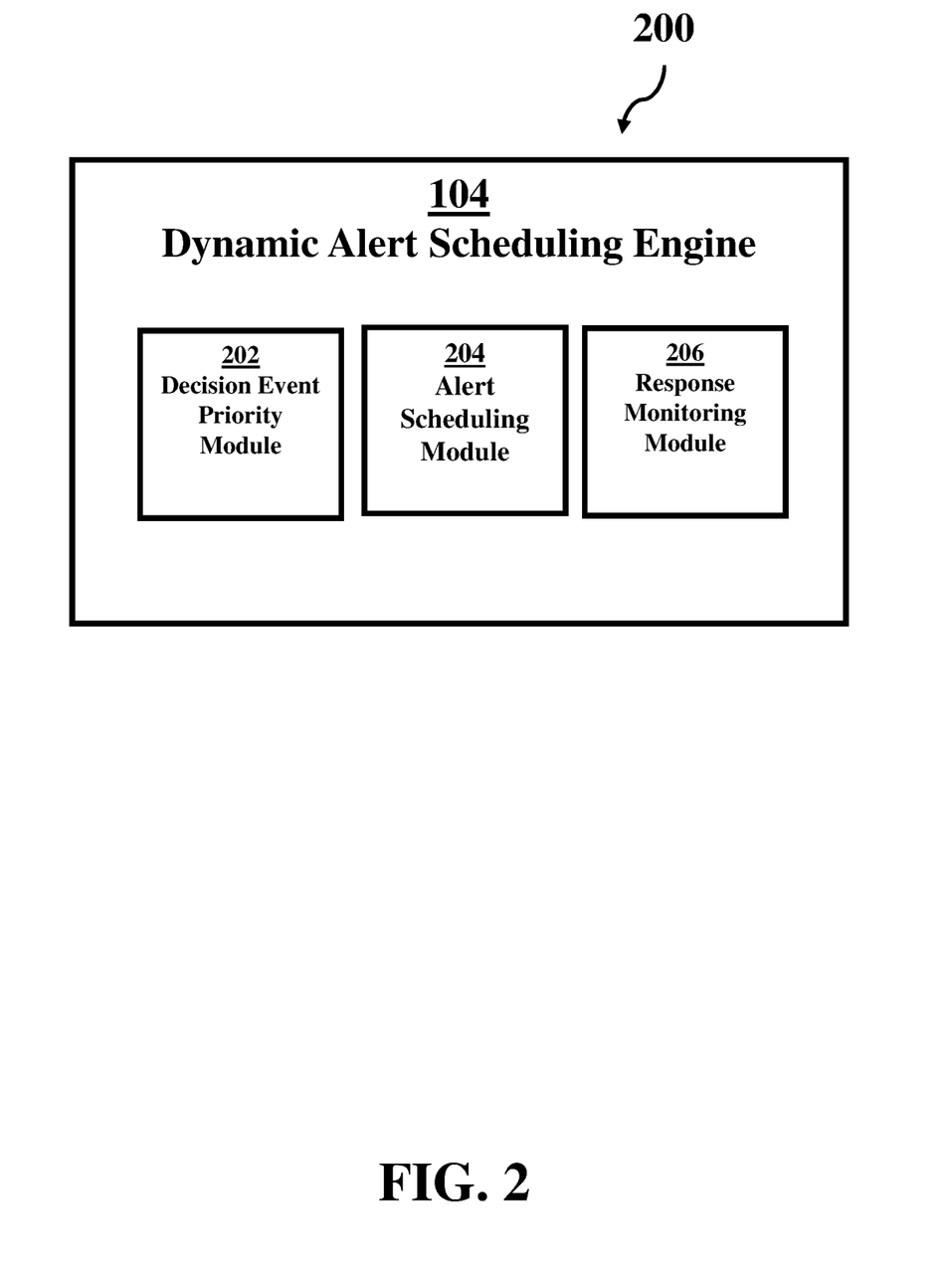
FIG. 2 is a functional block diagram of a dynamic alert scheduling engine, in accordance with an embodiment of the present invention.

FIG. 2 is block diagram 200 comprised of dynamic alert scheduling engine 104. Dynamic alert scheduling engine 104 can be comprised of decision event priority module 202, alert scheduling module 204, and response monitoring module 206.

Decision event priority module 202 is a computer module that can obtain historical decision event data for an organization and train an event decision priority model to prioritize a decision event based on the historical decision event data obtained. In an embodiment, decision event priority module 202 can train a machine learning model (e.g., a deep neural network, graph neural network, etc.) to classify a decision event into two or more classifications (e.g., priority or not priority) or generate a priority score. For example, all decision events (sales meetings, quarterly reports, surgical reviews, engine wear analysis, etc.) of an organization (commercial organization, non-profit organization, medical or veterinary hospital, agricultural research organization, etc.) can be retrieved by decision event priority module 202 and analyzed to train a machine learning model to accurately predict the priority of future decision events to the organization. Further, the individuals associated with the decision events can be included in the historical decision event data. In an embodiment, decision event priority module 202 can construct an organizational hierarchy based on the individuals associated with the decision event and the title of individuals associated with a decision event.

In another embodiment, decision event priority module 202 can have natural language processing capabilities to determine factors that can be used to quantify a priority of a decision event. Utilizing the natural language processing capabilities, decision event priority module 202 can parse through historical decision event data to determine a type for the decision event and classify the decision event based on type. In another embodiment, utilizing the natural language capabilities, decision event priority module 202 can determine the individuals involved in a decision event and the position of the individuals within an organization, which can be factored into a priority score. For example, a calendar event from the chief operating officer of an organization with the subject title "quarterly energy utilization" would receive a high priority score due to the fact the scheduler of the calendar event (the chief operating officer who is a high ranking official) sent the invitation and it is a quarterly meeting. While a calendar event from an individual with the title intern and a subject title, "coffee swap" would receive a lower priority score.

In an embodiment, decision event priority module 202 can determine events which have a primary and secondary impact on the alert windows associated with a group or individual. For example, if a group typically has slower response times during the months of June and July when individuals take leave for vacation, decision event priority module can identify which individuals take leave and adjust the priority ranking or score of a decision event accordingly.

In an embodiment, decision event priority module 202 can receive a future or upcoming decision event and assign a priority to the future decision event. For example, a decision event can be input into a user interface through input fields, or in an embodiment, decision event priority module 202 can parse a calendar invite or event description utilizing natural language processing capabilities. Decision event priority module 202 can accept the input or parsed sections of the decision event and can determine the priority of the future decision event through classification or quantification of the decision event.

Alert scheduling module 204 is a computer module that can dynamically schedule notifications for individuals, individuals within a group, or a whole group within an organization. In an embodiment, alert scheduling module 204 can receive the priority rating, score or classification from decision event priority module 202. Based on the priority of a decision event, alert scheduling module 204 can schedule a reminder/notification for the decision event.

In an embodiment, alert scheduling module 204 can access an individual's profile to further determine the priority for the individual. This is to prevent every event being categorized or scored as urgent or high for individuals with elevated positions within an organization. For example, an organization hierarchy can be accessed on historical decision database 106 through an organization profile with the current organizational make up. The individuals associated with a decision event can impact the urgency or number of notifications. Further in some embodiments, the timeframe which an individual completes tasks relating to a decision event can be factored into the scheduling of a notification. The timeframe data can be stored in the profile for of the individual. For example, if individual A generally completes tasks relating to a decision event two weeks prior to the expected completion of a decision event, alert scheduling module 204 can schedule a reminder to complete the task ten days prior to the expected completion of the decision task. Meanwhile, individual B completes tasks 2 or 3 days prior to an anticipated completion of the decision event. In this case, alert schedule module 204 can schedule a reminder 7 days prior to the entire group associated with the decision event and 2 days prior to only individual B.

In another embodiment, alert scheduling module 204 can reschedule alerts in response to additional decision events. For example, an individual is part of group A and group B. Group A has a medium priority decision event, then group B receives a high priority decision event shortly after the decision event alert for group A's has been scheduled by alert scheduling module 204, with a completion date prior to the decision event of group A. In this instance, alert scheduling module 204 can adjust the individual's alert for group A's decision event to a later time after the completion date of Group B's completion date of the high priority decision event.

In another embodiment, alert scheduling module 204 can determine facilitating and inhibiting factors which contribute to an individual's reaction time to a decision events deadline and apply a notification accordingly. For example, factors can include information quantity for an action, time spent historically on similar decision events, the investment or potential for additional team members to be added to the decision event, and the overall impact of the decision event. In an embodiment, the factors can be quantified based on time (e.g., minutes, hours, days, weeks, etc.) to allow for an optimized window in which a scheduled notification will have the optimal effect (e.g., likelihood above a predetermined threshold that the user attends the event that is scheduled, likelihood that the user accepts, acknowledges, or otherwise replies to the notification, etc.) on an individual or group.

In an embodiment, alert scheduling module 204 can respond to updates from response monitoring module 206 and update the notification frequency in regard to a decision event. For example, if an alert that a deadline is two weeks out for a decision event is sent to a group and 50% of the group performs a task associated with the decision event within 24 hours of receiving the alert, alert scheduling module 204 can update that the alert needs to be sent out later (2 or 3 days) in order to optimize the response of the group. Further, in another example, alert scheduling module 204 can personalize the alerts in response to receiving an individual's actions associated with the sent out alert. An individual that accomplished a task may receive the same alert, while an individual that did not accomplish a task or took 48 hours to accomplish a task will receive an alert earlier in the time period.

Response monitoring module 206 is a computer module that can be configured to monitor the response of an individual or individuals within a group to an alert or notification relating to a decision event. Further, in some embodiments, response monitoring module 206 can update the decision event priority model based on the monitored response(s) of individuals or groups. In an embodiment, response monitoring module 206 can provide feedback to alert scheduling module 204. The feedback can include what tasks associated with a decision event were completed or the progress made in the completion of a decision event.

Figure 3:
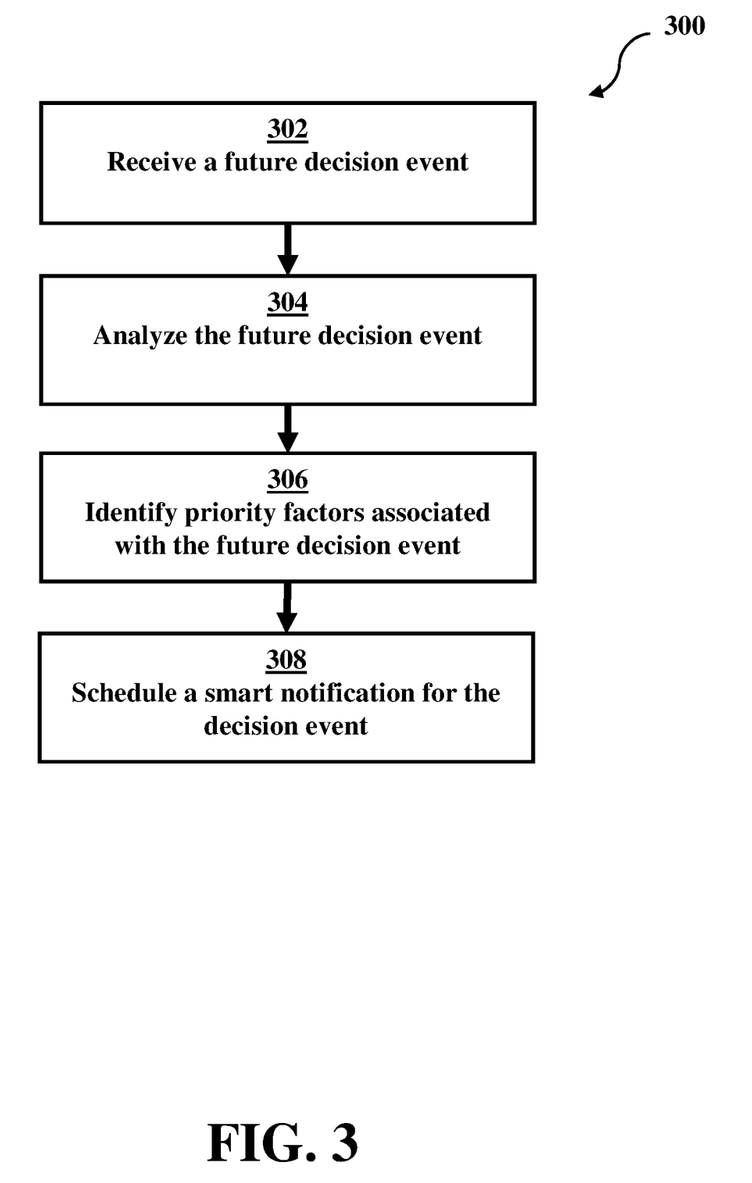
FIG. 3 is a flowchart of a method for dynamic alert scheduling, generally designated 300, in accordance with an embodiment of the present invention.

FIG. 3 is a flowchart depicting method 300 for dynamic smart notification scheduling. At step 302, decision event priority module 202 can receive a future decision event. For example, a group within an organization can input a decision event into a smart notification system associated with dynamic alert scheduling engine 104. The decision event can include details including the importance to the organization, individuals associated with the decision event, an expected end date for the decision event, benchmarks for the decision event, monetary budget for the decision event, expected human work hours, expected materials required to complete the decision event, additional decision events associated with the immediate decision event, etc.

At step 304, decision event priority module 202 can analyze the future decision event. In an embodiment, decision event priority module 202 can utilize natural language processing to parse details associated with the future decision event and compare details of the future decision event to details of historical decision events for the organization stored in historical decision event database 106. In another embodiment, decision event priority module 202 can quantify details associated with the future decision event into vectors and analyze the details utilizing a machine learning model (e.g., deep neural network, etc.) to classify the priority of the future decision event.

At step 306, decision event priority module 202 can identify one or more priority factors associated with the future decision event. For example, decision event priority module 202 can analyze the individuals associated with the future decision event and compare the individuals to an organizational hierarchy stored on historical decision event database 106. In an embodiment, decision event priority module 202 can generate a priority score for the future decision event during the analysis process. The priority score can be based on a comparison of details of the future decision event and a comparison of similar historical decision events stored on historical decision event database 106. In another embodiment, a priority factor can be the schedule and the historical response time of an individual or a group of individuals associated with the future event decision. For example, an individual can have a busy schedule in and around the time a benchmark associated with the future decision event is due. In this case, decision event priority module 202 could provide a higher priority or generate a higher priority score for that individual, which could cause alert scheduling module 204 to schedule more alerts, or alerts at times which the individual is available to devote time to the decision event benchmark.

At step 308, alert scheduling module 204 can schedule a smart alert for the future decision event, based on the identified priority factors associated with the future decision event. For example, individuals associated with the future decision event can have a notification placed in a calendar or a reminder list associated with the organization. In an embodiment, a machine learning module associated with alert scheduling module 204 can insert alerts/notifications/reminders for the future event decision event at optimal times, which will produce a positive response to the alert above a threshold.

FIG. 4 depicts computer system 10, an example computer system representative of server 102, client computer A 110 and client computer B 112. Computer system 10 includes communications fabric 12, which provides communications between processing unit 14, memory 16, persistent storage 18, network adaptor 28, and input/output (I/O) interface(s) 26. Communications fabric 12 can be implemented with any architecture designed for passing data and/or control information between processors (such as microprocessors, communications, and network processors, etc.), system memory, peripheral devices, and any other hardware components within a system. For example, communications fabric 12 can be implemented with one or more buses or a crossbar switch.

Memory 16 and persistent storage 18 are computer readable storage media. In an embodiment, memory 16 includes random access memory (RAM) 20. In general, memory 16 can include any suitable volatile or non-volatile computer readable storage media. Cache 22 is a fast memory that enhances the performance of processing unit 14 by holding recently accessed data, and data near recently accessed data, from memory 16.

Program instructions and data used to practice embodiments of the present invention may be stored in persistent storage 18 and in memory 16 for execution by one or more of the respective processing units 14 via cache 22. In an embodiment, persistent storage 18 includes a magnetic hard disk drive. Alternatively, or in addition to a magnetic hard disk drive, persistent storage 18 can include a solid state hard drive, a semiconductor storage device, read-only memory (ROM), erasable programmable read-only memory (EPROM), flash memory, or any other computer readable storage media that is capable of storing program instructions or digital information.

The program/utility, having at least one program module 24, may be stored in memory 16 by way of example, and not limiting, as well as an operating system, one or more application programs, other program modules, and program data. Each of the operating systems, one or more application programs, other program modules, and program data or some combination thereof, may include an implementation of a networking environment. Program module 24 generally carries out the functions and/or methodologies of embodiments of the invention, as described herein.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Network Adaptor 28, in these examples, provides for communications with other data processing systems or devices. In these examples, network adaptor 28 includes one or more network interface cards. Network Adaptor 28 may provide communications through the use of either or both physical and wireless communications links. Program instructions and data used to practice embodiments of the present invention may be downloaded to persistent storage 18 through network adaptor 28.

I/O interface(s) 26 allows for input and output of data with other devices that may be connected to each computer system. For example, I/O interface(s) 26 may provide a connection to external devices 30 such as a keyboard, keypad, a touch screen, and/or some other suitable input device. External devices 30 can also include portable computer readable storage media such as, for example, thumb drives, portable optical or magnetic disks, and memory cards. Software and data used to practice embodiments of the present invention can be stored on such portable computer readable storage media and can be loaded onto persistent storage 18 via I/O interface(s) 26. I/O interface(s) 26 also connect to display 32.

Display 32 provides a mechanism to display data to a user and may be, for example, a computer monitor, touchscreen, and/or augmented virtual reality device.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
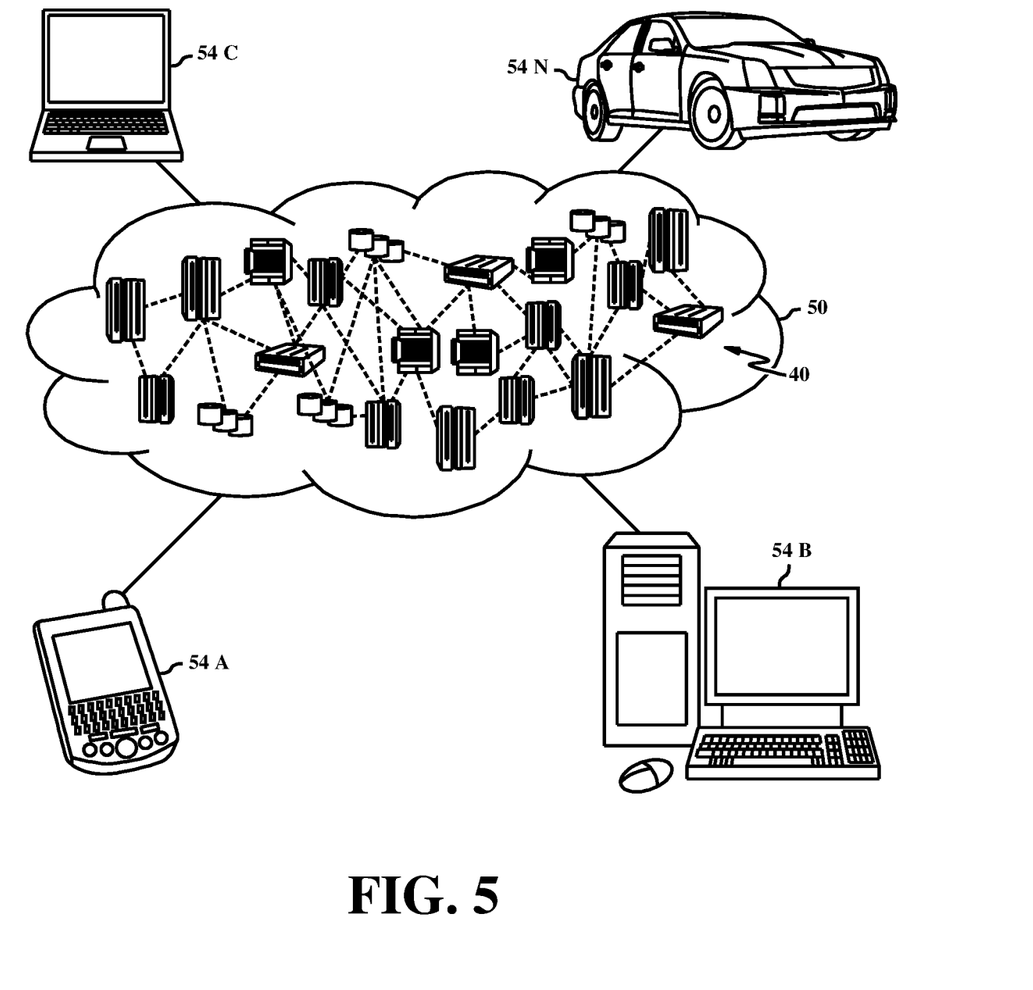
FIG. 5 is a diagram depicting a cloud computing environment 50, in accordance with an embodiment of the present invention.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
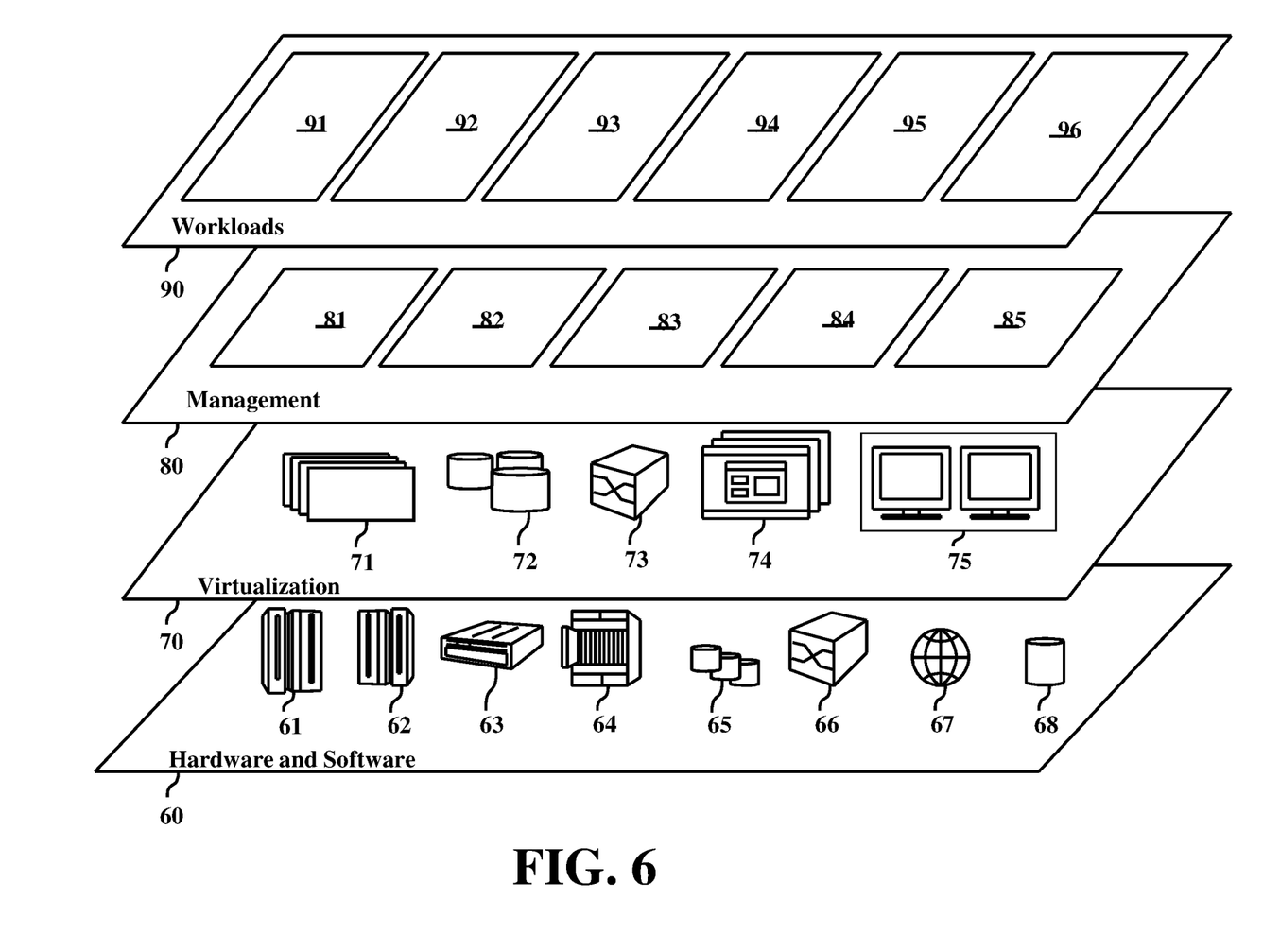
FIG. 6 is a functional block diagram depicting abstraction model layers, in accordance with an embodiment of the present invention.

Referring now to FIG. 6, a set of functional abstraction layers provided by cloud computing environment 50 (depicted in FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and dynamic alert scheduling 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

What is claimed is:

1. A computer-implemented method for dynamic smart notification scheduling, the computer-implemented method comprising:

obtaining, by a processor, historical decision event data for an organization, wherein
the historical decision event data includes a plurality of organizational member profiles for a plurality of members of the organization and a plurality of organizational decision events,
each organizational decision event of the plurality of organizational decision events includes at least a plurality of actions associated with completing the each organizational decision event, and
each of the plurality of organizational member profiles includes at least one of a position of a corresponding member of the plurality of members within the organization, contacts of the corresponding member with the plurality of members other than the corresponding member, a plurality of actions corresponding to a historical decision event, timeframe at which the corresponding member undertakes the plurality of actions, and an outcome of the plurality of actions;

training, by the processor, an event decision priority model based, at least in part, on the historical decision event data;

generating, by the processor, a state of a current organization hierarchy of the organization based on at least the position of each of the plurality of members within the organization, wherein the state of the current organization hierarchy is comprised of a relationship tree for the organization;

receiving, by the processor, a future decision event associated with a group within the current organization hierarchy of the organization, wherein the received future decision event includes information associated with at least the group;

parsing, by the processor, using the trained event decision priority model, one or more historical decision events from the historical decision event data, wherein the one or more historical decision events are similar to the received future decision event;

comparing, by the processor, using the trained event decision priority model, results of the parsed one or more historical decision events with the information included in the received future decision event;

identifying, by the processor, using the trained event decision priority model, one or more priority factors associated with the received future decision event, wherein
the one or more priority factors are identified based, at least in part, on the comparison and the state of the current organization hierarchy, and
the one or more priority factors include position of a scheduler of the received future decision event within the organization, time spent historically on similar decision events similar to the future decision event, a potential for additional team members to be added to the received future decision event, and an impact of the received future decision event on the organization;

scheduling, by the processor, a first smart notification for the received future decision event, based on the identified one or more priority factors, wherein the first smart notification is scheduled with priority based on the position of the scheduler is higher among positions of the plurality of members within the organization;

sending, by the processor, the first smart notification;

receiving, by the processor, responses to the sent first smart notification;

determining, by the processor, based on the received responses, a number of the received responses, response time associated with the received responses, and an action associated with each of the received responses, wherein the action indicates one of: completion of a task associated with the sent first smart notification or a progress made towards the completion of the task;

dynamically adjusting, by the processor, based on the determining, using the trained event decision priority model, a frequency of repetition notifications associated with the received future decision event;

generating, by the processor, a first schedule to transmit a second smart notification to a first individual, based on the dynamic adjustment of the frequency of repetition notifications associated with the received future decision event;

generating, by the processor, a second schedule to transmit a third smart notification to a second individual earlier than the first schedule of the second smart notification for the first individual,
   wherein the generation of the second schedule for the second individual based on the dynamically adjusted frequency and a determination that the completion of the task by the second individual is after a threshold time period or a determination that execution of the task by the second individual is incomplete; and
transmitting, by the processor, the second smart notification to the first individual and the third smart notification to the second individual,
   wherein the second smart notification and the third smart notification are transmitted as the repetition notifications.

2. The computer-implemented method for the dynamic smart notification scheduling of claim 1, further comprising:
identifying, by the processor, one or more additional future decision events associated with one or more members of the group; and
ranking, by the processor, each additional identified future decision event, of the one or more additional future decision events, associated with each member of the group based, at least in part, on the trained event decision priority model.

3. The computer-implemented method for the dynamic smart notification scheduling of claim 1, wherein the training of the event decision priority model further comprises:
parsing, by the processor, the historical decision event data based, at least in part, on a natural language processing model;
identifying, by the processor, one or more organization critical events based, at least in part, on the parsing of the historical decision event data; and
generating, by the processor, an event decision priority tree based, at least in part, on the identified one or more organizational critical events.

4. A computer system for dynamic smart notification scheduling, the computer system comprising:
a memory; and
a processor in communication with the memory, the processor being configured to perform operations to:
   obtain historical decision event data for an organization, wherein
     the historical decision event data includes a plurality of organizational member profiles for a plurality of members of the organization and a plurality of organizational decision events,
     each organizational decision event of the plurality of organizational decision events includes at least a plurality of actions associated with completion of the each organizational decision event, and
     each of the plurality of organizational member profiles includes at least one of a position of a corresponding member of the plurality of members within the organization, contacts of the corresponding member with the plurality of members other than the corresponding member, a plurality of actions corresponding to a historical decision event, timeframe at which the corresponding member undertakes the plurality of actions, and an outcome of the plurality of actions;
   train an event decision priority model based, at least in part, on the historical decision event data;
   generate a state of a current organization hierarchy of the organization based on at least the position of each of the plurality of members within the organization, wherein the state of the current organization hierarchy is comprised of a relationship tree for the organization;
   receive a future decision event associated with a group within the current organization hierarchy of the organization, wherein the received future decision event includes information associated with at least the group;
   parse, using the trained event decision priority model, one or more historical decision events from the historical decision event data, wherein the one or more historical decision events are similar to the received future decision event;
   compare, using the trained event decision priority model, results of the parsed one or more historical decision events with the information included in the received future decision event;
   identify, using the trained event decision priority model, one or more priority factors associated with the received future decision event, wherein
     the one or more priority factors are identified based, at least in part, on the comparison and the state of the current organization hierarchy, and
     the one or more priority factors include position of a scheduler of the received future decision event within the organization, time spent historically on similar decision events similar to the future decision event, a potential for additional team members to be added to the received future decision event and an impact of the received future decision event on the organization;
   schedule a first smart notification for the received future decision event, based on the identified one or more priority factors, wherein the first smart notification is scheduled with priority based on the position of the scheduler is higher among positions of the plurality of members within the organization;
   send the first smart notification;
   receive responses to the sent first smart notification;
   determine, based on the received responses, a number of the received responses, response time associated with the received responses, and an action associated with each of the received responses, wherein the action indicates one of: completion of a task associated with the sent first smart notification or a progress made towards the completion of the task;
   dynamically adjust, based on the determining, using the trained event decision priority model, a frequency of repetition notifications associated with the received future decision event;
   generate a first schedule to transmit a second smart notification to a first individual, based on the dynamic adjustment of the frequency of repetition notifications associated with the received future decision event;
   generate a second schedule to transmit a third smart notification to a second individual earlier than the first schedule of the second smart notification for the first individual,
     wherein the generation of the second schedule for the second individual based on the dynamically adjusted frequency and a determination that the completion of the task by the second individual is after a threshold time period or a determination that execution of the task by the second individual is incomplete; and transmit the second smart notification to the first individual and the third smart notification to the second individual,
   wherein the second smart notification and the third smart notification are transmitted as the repetition notifications.

5. The computer system for the dynamic smart notification scheduling of claim 4, further comprising the operations to:
   identify one or more additional future decision events associated with one or more members of the group; and
   rank each additional identified future decision event, of the one or more additional future decision events, associated with each member of the group based, at least in part, on the trained event decision priority model.

6. The computer system of claim 4 for the dynamic smart notification scheduling, wherein the training of the event decision priority model further comprises the operations to:
   parse the historical decision event data based, at least in part, on a natural language processing model;
   identify one or more organization critical events based, at least in part, on the parsing of the historical decision event data; and
   generate an event decision priority tree based, at least in part, on the identified one or more organizational critical events.

7. A computer program product for dynamic smart notification scheduling, the computer program product comprising:
   a computer readable storage device; and
   program instructions stored on the computer readable storage device to perform operations comprising:
      obtaining historical decision event data for an organization, wherein
         the historical decision event data includes a plurality of organizational member profiles for a plurality of members of the organization and a plurality of organizational decision events,
         each organizational decision event of the plurality of organizational decision events includes at least a plurality of actions associated with completing the each organizational decision event, and
         each of the plurality of organizational member profiles includes at least one of a position of a corresponding member of the plurality of members within the organization, contacts of the corresponding member with the plurality of members other than the corresponding member, a plurality of actions corresponding to a historical decision event, timeframe at which the corresponding member undertakes the plurality of actions, and an outcome of the plurality of actions;
      training an event decision priority model based, at least in part, on the historical decision event data;
      receiving future decision event associated with a group within a current organization hierarchy of the organization, wherein the received future decision event includes information associated with at least the group;
      generating a state of the current organization hierarchy based on at least the position of each of the plurality of members within the organization, wherein the state of the current organization hierarchy is comprised of a relationship tree for the organization;
      parsing, using the trained event decision priority model, one or more historical decision events from the historical decision event data, wherein the one or more historical decision events are similar to the received future decision event;
      comparing, using the trained event decision priority model, results of the parsed one or more historical decision events with the information included in the received future decision event;
      identifying, using the trained event decision priority model, one or more priority factors associated with the received future decision event, wherein
         the one or more priority factors are identified based, at least in part, on the comparison and the state of the current organization hierarchy, and
         the one or more priority factors include a position of a scheduler of the received future decision event within the organization, time spent historically on similar decision events similar to the future decision event, a potential for additional team members to be added to the received future decision event, and an impact of the received future decision event on the organization;
      scheduling a first smart notification for the received future decision event, based on the identified one or more priority factors, wherein the first smart notification is scheduled with priority based on the position of the scheduler is higher among positions of the plurality of members within the organization;
      sending the first smart notification;
      receiving responses to the sent first smart notification;
      determining, based on the received responses, a number of the received responses, response time associated with the received responses, and an action associated with each of the received responses, wherein the action indicates one of: completion of a task associated with the sent first smart notification or a progress made towards the completion of the task;
      dynamically adjusting, based on the determining, using the trained event decision priority model, a frequency of repetition notifications associated with the received future decision event;
      generating a first schedule to transmit a second smart notification to a first individual, based on the dynamic adjustment of the frequency of repetition notifications associated with the received future decision event;
      generating a second schedule to transmit a third smart notification to a second individual earlier than the first schedule of the second smart notification for the first individual,
         wherein the generation of the second schedule for the second individual based on the dynamically adjusted frequency and a determination that the completion of the task by the second individual is after a threshold time period or a determination that execution of the task by the second individual is incomplete; and
      transmitting the second smart notification to the first individual and the third smart notification to the second individual,
         wherein the second smart notification and the third smart notification are transmitted as the repetition notifications.

8. The computer program product for the dynamic smart notification scheduling of claim 7, wherein the program instructions stored on the computer readable storage device to perform the operations further comprising:

identifying one or more additional future decision events associated with one or more members of the group; and ranking each additional identified future decision event, of the one or more additional future decision events, associated with each member of the group based, at least in part, on the trained event decision priority model.

9. The computer program product for the dynamic smart notification scheduling of claim 7, wherein the program instructions stored on the computer readable storage device to perform the operations further comprising:

parsing the historical decision event data based, at least in part, on a natural language processing model;

identifying one or more organization critical events based, at least in part, on the parsing of the historical decision event data; and generating an event decision priority tree based, at least in part, on the identified one or more organizational critical events.

* * * * *